United States Patent [19]

Farmer

[11] 4,248,082
[45] Feb. 3, 1981

[54] ANEMOMETER

[76] Inventor: D. Eugene Farmer, Box 542, Mt. Gay, W. Va.

[21] Appl. No.: 973,858

[22] Filed: Dec. 28, 1978

[51] Int. Cl.³ ............................................. G01W 1/00
[52] U.S. Cl. ................................................... 73/170 R
[58] Field of Search .................... 324/78 D, 166, 167, 324/173, 174; 73/189, 170 R

[56] References Cited

U.S. PATENT DOCUMENTS

| 3,777,121 | 12/1973 | Jamieson | 324/166 X |
| 3,777,263 | 12/1973 | Perron et al. | 73/189 X |
| 3,805,161 | 4/1974 | Bayha et al. | 324/174 X |
| 3,916,326 | 10/1975 | Woyton | 324/166 X |
| 3,970,935 | 7/1976 | Beery et al. | 324/166 |

Primary Examiner—Jerry W. Myracle
Attorney, Agent, or Firm—Cushman, Darby & Cushman

[57] ABSTRACT

An anemometer which reads the airspeed in digital numbers by light-emitting diodes. A small electric generator is operated by a windmill. This generator output is sent through digital circuitry and ultimately read out in numbers on LEDs.

1 Claim, 3 Drawing Figures

ANEMOMETER

My invention relates to anemometers, or devices used to measure the speed of air at a given place at a given time. My particular model deals with the portable type such as those used by miners to check air flow in an air passage in a mine.

Objects of my invention are to provide a better anemometer, one that is faster and easier to read, one that is more sturdy, one that is more versatile, one that will allow for improvements that can not be made in the present models.

Various other improvements can be seen from the following description of the attached drawings, in which FIG. 1 is a front view of my proposed anemometer with the air velocity read on the light-emitting-diodes (LEDs);

Figure 1:
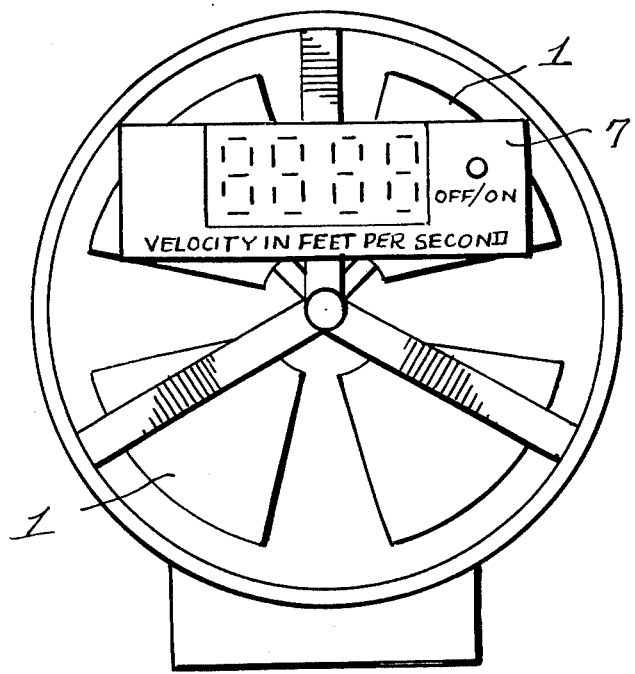
Figure 2:
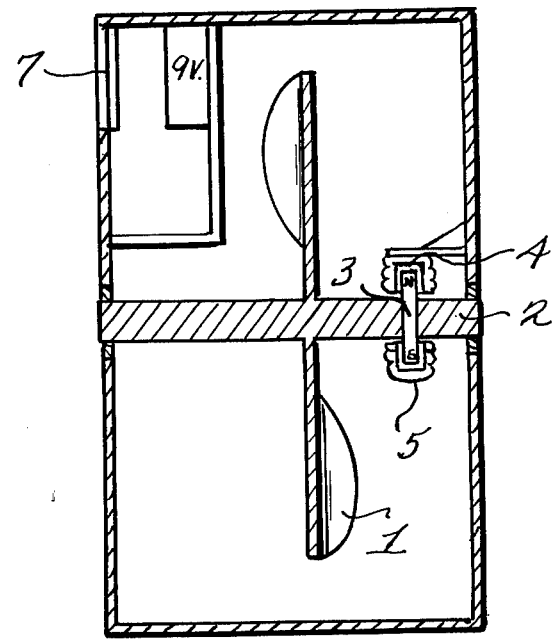
FIG. 2 is a side cross-sectional view of the inner workings of my anemometer.

As you can see from FIG. 1 and FIG. 2 my anemometer is different from present models in that it is electrical in nature instead of mechanical. In FIG. 2 you can see a conventional windmill (1) on a shaft (2). The windmill is permanently affixed to the shaft so that when the windmill turns the shaft also turns. This windmill is designed to allow a known amount of air (in this case $\frac{1}{2}$ cubic foot) per revolution through. Onto the shaft of the windmill is also permanently affixed a permanent type round cylindrical shaped magnet (3). Around this magnet is wound on a stationary plastic spool 4) several windings of small size wire (5) which are insulated from each other by using laquer coated wire. This wire has sufficient windings to produce an electric current. When the magnet turns through the field once it produces $\frac{1}{2}$ microampere of current in the windings. The ends of this wire are then connected to the input of the solid-state printed circuit board (6) and then finally read out on the LEDs (7).

Figure 3:
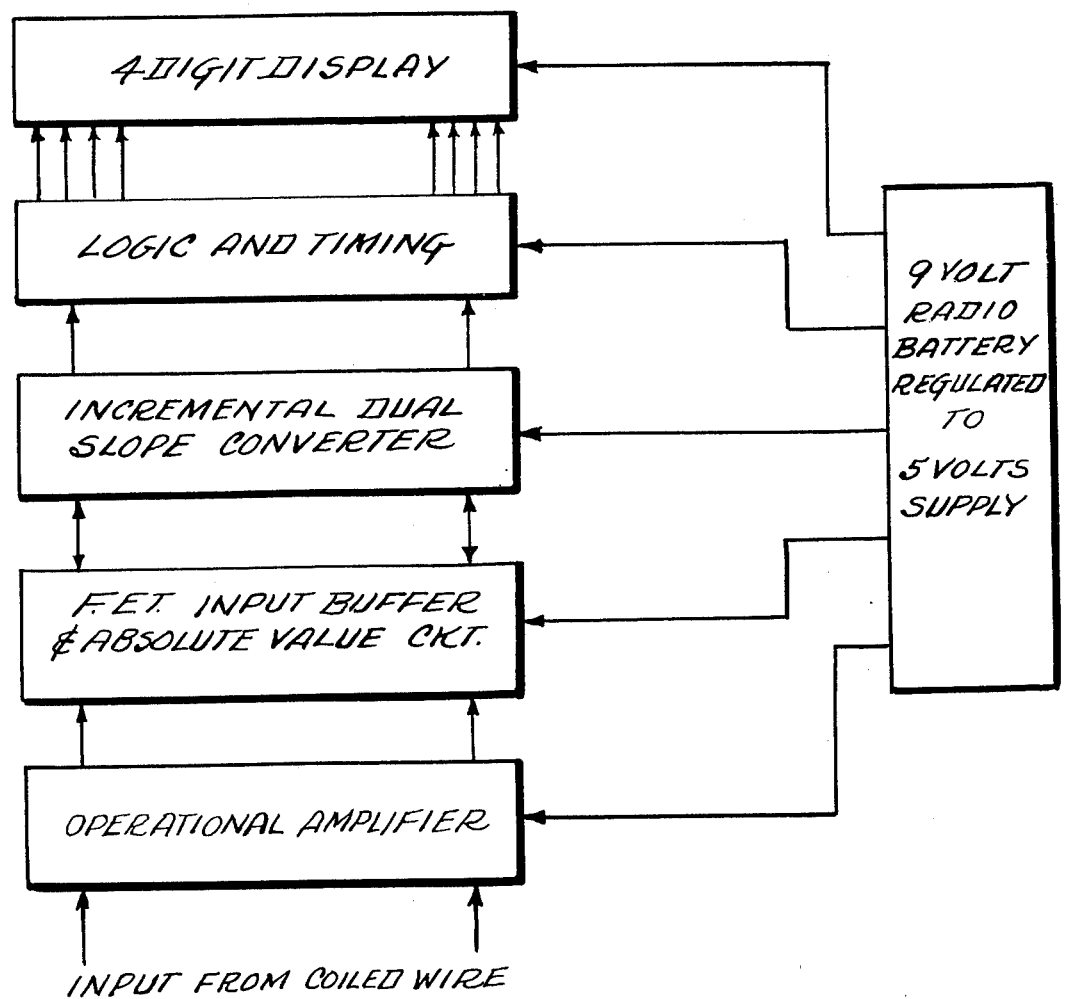
FIG. 3 is a block diagram of the solid state digital circuitry used in my invention.

As you can see from FIG. 2, as the windmill (1) turns, with the shaft (2) with the permanent magnet (3) attached, the magnet will induce, by electromagnetic induction, an alternating current in the wire windings (5). This current strength will be directly proportional to the speed of the windmill because the other factors effecting its production are constant, those being the magnet strength of the permanent magnet and the number of windings in the wire. Therefore this electric current can be calibrated to read the speed of the windmill and therefore the speed of the air passing through it. To do this I chose the digital electronic circuitry shown in FIG. 3. This circuit is a digital current measuring circuit. It is designed to step or count every miroampere that is fed into it and display that figure in LEDs (7).

The basic functioning of the digital circuit is as follows: the input from the wire windings (5) is fed-into an operational amplifier then into a field-effect transistor FET input buffer and absolute valve circuit where it is again amplified and rectified. Then it is fed into an Incremental Dual Slope Converter which generates a pulse rate which is proportional to the input voltage. These pulses are then gated into an event counter by a clock derived time base so that the display is updated after each conversion.

The power supply I chose was a 9 volt transistor radio battery which is regulated to 5 volts by an integrated circuit (I. C.). This I C will provide a constant 5 volt supply, which is the operating voltage of the digital circuitry. The switch I choose to use is a spring-loaded switch which is only closed when the button is pushed. This is to conserve battery strength.

I claim:

1. A digital anemometer comprising:
   a shaft having a longitudinal axis;
   a plurality of blades fixed to the periphery of said shaft extending perpendicularly from said axis such that a flow of fluid against said blades in a longitudinal direction causes said blades and said shaft to rotate about said longitudinal axis;
   a magnet fixed to said shaft;
   an insulated electrical coil wound about said magnet such that said magnet rotates within said coil and an electrical signal is generated therein when said shaft rotates, said signal having a maximum amplitude which is proportional to the rate of rotation of said shaft;
   a plurality of light emitting diodes; and electrical means, responsive to said signal, for displaying said rate of rotation on said light emitting diodes;
   said electrical means including means, coupled to said coil, for rectifying said electrical signal to produce a rectified signal;
   means, coupled to said rectifying means, for generating electrical pulses at a rate proportional to the amplitude of said rectified signal;
   means, coupled to said generating means, for generating a count of said pulses; and
   said light emitting diodes being responsive to said count for displaying said rate of rotation.

* * * * *